(12) United States Patent
Studer

(10) Patent No.: US 7,617,779 B2
(45) Date of Patent: Nov. 17, 2009

(54) LINEAR BRUSHLESS D.C. MOTOR WITH STATIONARY ARMATURE AND FIELD AND WITH INTEGRATABLE MAGNETIC SUSPENSION

(75) Inventor: Philip Albert Studer, Silver Spring, MD (US)

(73) Assignees: Sandor Shapery, San Diego, CA (US); Shapery Enterprises, San Diego, CA (US)

( * ) Notice: Subject to any disclaimer, the term of this patent is extended or adjusted under 35 U.S.C. 154(b) by 273 days.

(21) Appl. No.: 11/272,103

(22) Filed: Nov. 4, 2005

(65) Prior Publication Data

US 2006/0113848 A1 Jun. 1, 2006

Related U.S. Application Data

(60) Provisional application No. 60/627,706, filed on Nov. 15, 2004.

(51) Int. Cl.
*B60L 13/00* (2006.01)
*H02K 41/00* (2006.01)

(52) U.S. Cl. .................. 104/130.02; 310/12.18

(58) Field of Classification Search .................. 310/12, 310/15, 168, 12.18, 12.21; 104/281–289, 104/292–294, 130.02; 335/297, 302
See application file for complete search history.

(56) References Cited

U.S. PATENT DOCUMENTS

| | | | | |
|---|---|---|---|---|
| 3,569,804 A | * | 3/1971 | Studer | 318/138 |
| 3,594,622 A | * | 7/1971 | Inagaki | 318/687 |
| 3,694,041 A | * | 9/1972 | Studer | 310/90.5 |
| 3,706,922 A | * | 12/1972 | Inagaki | 318/135 |
| 3,797,402 A | * | 3/1974 | Karch | 104/130.02 |
| 3,845,720 A | * | 11/1974 | Bohn et al. | 104/130.02 |
| 3,911,828 A | * | 10/1975 | Schwarzler | 104/294 |
| 4,315,197 A | * | 2/1982 | Studer | 318/135 |
| 4,324,185 A | * | 4/1982 | Vinson | 104/283 |
| 5,009,865 A | * | 4/1991 | Boden et al. | 117/202 |
| 5,757,098 A | * | 5/1998 | Higuchi et al. | 310/90.5 |
| 5,923,109 A | * | 7/1999 | Higuchi et al. | 310/90.5 |
| 5,959,382 A | * | 9/1999 | Dauwalter | 310/90.5 |
| 6,268,673 B1 | * | 7/2001 | Shah et al. | 310/90.5 |
| 6,396,178 B1 | * | 5/2002 | Chiu | 310/67 R |
| 6,977,451 B2 | * | 12/2005 | Onishi | 310/12 |

* cited by examiner

*Primary Examiner*—Tran N Nguyen
(74) *Attorney, Agent, or Firm*—Shapery Innovative Transportation Systems Corp.

(57) ABSTRACT

This disclosure describes an electromagnetic system for efficient propulsion, suspension, and guidance. The track is inexpensive totally passive steel. This linear form of the D.C. motor provides traction motor characteristics without physical contact, The moveable element (vehicle) comprises both the integrated armature and field magnet flux source which induces magnetizing flux into pairs of rails each energizing a set of interdigitated poles of alternating polarity in the track against which its own armature conductors interact for thrust and braking. This source of magnetic flux requires no power and provides passive suspension at any speed and, with control, guidance. The permanent magnet and control flux in common airgaps multiply the effectiveness of lateral control for magnetic stabilization and to restrain external forces.

16 Claims, 3 Drawing Sheets

LINEAR BRUSHLESS D.C. MOTOR WITH STATIONARY ARMATURE AND FIELD AND WITH INTEGRATABLE MAGNETIC SUSPENSION

CROSS-REFERENCE TO RELATED APPLICATIONS

This application claims priority to U.S. Provisional Application No. 60/627,706, filed on Nov. 15, 2004.

BACKGROUND OF THE INVENTION

1. Field of the Invention

This invention relates to brushless motors, and in particular to linear brushless motors.

2. Description of the Related Art

The history of linear motor technology dates far into the past. To simplify, this will be divided into the electromagnetic design and the commutation. With regard to the electromagnetics, motor technology proceeded primarily in rotary form. The linear motor form is also old, this can further broken into actuators and linear motors. Actuators may be defined as short linear or rotary devices and have unique structures not feasible for extended motion. Linear motors are defined here as electromagnetic devices which need or use commutation to extend their range of useful stroke.

The electromagnetic design of linear motors follows the well-known laws of classical electromagnetic theory. Early devices are like the common voice coil which is of the ironless armature type. They are efficient, have control linearity, but require considerable magnetic material, are not low cost nor lightweight. They are suitable for certain applications and are included in the scope of this application. The ironless armature motor in rotary form has a heritage in fast response servo systems and were utilized at Goddard Space Flight Center (GSFC) in the early 1970s in flywheels for low loss rotation. They are readily implemented in linear form and minimize the magnetic design but few applications reach linear velocities which warrant their large magnet requirement to drive flux across an airgap wide enough to accommodate the armature windings.

The more general form of d.c. motors its armature windings placed in slots of laminated steel which provides a low reluctance path for magnetic flux or sometimes wound directly on their (not slotted) surface, These may be planer surfaces mechanically supported to maintain a uniform gap while allowing axial motion, or other geometries including cylindrical concentric shapes to minimize "end turns" and stray magnetic field losses. In virtually every case, two elements are involved, armature assembly and the field assembly. This was the case until the d.c. motor with stationary armature and field was developed at the Goddard Space Flight Center as described in U.S. Pat. No. 3,569,804. This machine has its field assembly divided into two parts (1) the source of field flux which can be physically attached to the armature assembly and (2) a passive salient pole structure.

Progress thru the past 30 years has been primarily driven by improved materials especially SmCo (samarium-cobalt), and NdFeB (neodymium) magnets which are vastly more powerful. As in the past, linear motor design followed the much more common rotary machines.

The commutation of linear motors trailed far behind that of rotary devices due to the mechanical difficulties of implementation. The advent of electronic commutation in 1962; See NAS 5-2108. Development of a Brushless D.C. Motor, changed commutation from a mechanical problem of sliding contacting surfaces to one of electronics which has seen tremendous strides not only in size and capability but more recently in power handling capability. (For example, a 160 Amp IGBT that was recently marketed by IR Corp.) The same company also sells small integrated circuit three phase, high voltage drivers for motor drives. Thus the problem for the linear motor designer today is the selection and placement of suitable position sensors, the proper choice of IC (integrated circuit) switches, and the electromagnetic and electromechanical design of the linear motor itself.

SUMMARY

This document discloses a new type of type of direct current linear motor. It possesses the same type of performance characteristics associated with linear d.c. motors generally, it differs in that the field is composed of two physically separate parts. The source of its magnetic flux (either permanent and/or electromagnetic) is located with the armature and energizes the pole structure via airgaps that allow the pole structure to be moved by or generate armature currents in the classical motor action manner.

This division of the field into two elements yields many useful possibilities, one of the more obvious is that a single magnet can energize an array of poles, another is that all heat dissipation can be removed from an active part of the motor, a third is that since only strong magnetic flux links the moving element and its forces can be oriented by design and electrically controlled, magnetic suspension and alignment are inherent prospects as will be illustrated.

The division of magnetic flux from a single magnet to a multipolar element is readily illustrated and is energy neutral but may represent a large material and assembly cost savings.

The location of thermal dissipation can be a critical concern in certain applications such as the precision motion demands of the semiconductor processing industry. Magnetic flux transfer dissipates no energy when there is no change in reluctance, thus high levels of magnetic flux can be transferred from the stationary source to a moving pole structure with no friction nor thermal problems, the pole structure does not need to be high resistivity or of laminated construction.

With the field source located with the armature, power and control can be directly applied electromagnetically bringing a whole class of applications into being. For example, the peak of the motor's efficiency curve can be dynamically controlled to match the existing load condition, ideal for variable speed applications, realistically helping the national energy concerns.

This disclosure describes a machine which integrates the functions of suspension and propulsion by electromagnetic means without physical contact between surfaces in relative motion. These functions have been previously accomplished by separate devices. This new system employs an electronically commutated linear d.c. motor of three part construction integral with a suspension having new features not heretofore known. The three parts consist of an armature of conventional form, a source of magnetic flux fixed physically to the armature, while its mating part with salient poles carries the propulsive force and axial motion between them is unconstrained but controllable. This novel separation of the field elements, connected only by the magnetic flux flowing between them is what allows controllable suspension and propulsion forces to be generated from common electromagnetic elements, it is a novel type of motor.

The suspended drive assembly can fit within a small envelope. It contains the source of magnetic flux for both motor action and its (and its payload) suspension. This synergistic dual use is felt to be new. The drive assembly has axially continuous surfaces along its length which mate with continuous axially oriented surfaces on the third element between which flux passes from the source to the pole structure and back from the pole structure to the source, completing the magnetic circuit. This same flux path also was diverted across an airgap interacting with armature conductors producing propulsive force and returning back across the same gap as part of the same circuit. These four traverses of the airgap all generate forces drawing the surfaces together, and if properly oriented and controlled can suspend and position one with respect to the other, with no physical contact and no restraint on axial motion.

Each of the two axially continuous surfaces, which are polarized, have salient poles facing each other and interdigitated so north and south poles alternate down the axial centerline so that armature conductors in the proper phase relationship can be connected and commutated in the usual fashion to produce axial thrust or braking. Transverse armature currents interact with the perpendicular flux traversing the airgap to produce that axial force or, if pushed, current are generated to oppose the motion. The salient poles which define the direction and location of the magnetic field flux are constituent parts of the "rail" toward which the motor (armature and field source) faces across an airgap and against which the motor action reacts.

These same magnetic fluxes generate large forces of attraction between these surfaces sufficient to carry the weight of the machine and considerable payload. The forces are highly non-linear so that active fast responding control is required, moreover the magnetic reluctance is a non-linear function of displacement (airgap). For this reason, the primary suspension airgaps are inverted so that flux passing from one body to the other is oppositely directed on its return. The motion of one body toward the other opens one gap while closing the other, this keeps the total magnetic reluctance relatively constant, reducing the control difficulty.

The armature itself is completely standard, and the materials and methods of manufacture are all well known and generally accepted in the motor industry. The electronics for commutation and control are commonly known. The magnetic suspension techniques are less generally developed but follow good servo practice excepting for the inherent attractive-only force and great non-linearity associated with magnetic forces.

This motor may also be built with what is referred to as an "ironless armature" construction because the armature is not directly involved in claims of a new field configuration. In that type of motor the armature conductors are free-standing rather than being placed in slotted laminations. It has the benefits of eliminating "iron losses" but puts much greater requirements on the coercive force of the field magnet because of the larger airgap. The physical support of the conductors is also a challenging design problem. A drawing Fig. illustrates a design effort to place permeable salient poles of opposite polarity on both sides of a linear array of conductors, as drawn, the linear array might have to be supported at the end, limiting the stroke, however other designs are certainly possible avoiding this limitation.

It is also feasible to have the moving element in cylindrical form which has many advantages including balancing lateral forces, reducing stray magnetic losses, and improving the structural properties of the moving element. These variations are illustrative only, meant to provide some insight into the flexibility of the design configurations in which this concept may be applied and help distinguish the essential features of the new motor type. A cylindrical pole assembly allows multiple armature segments and field poles to surround it so that radial forces are balanced and canceled when they are held centered. The central region can allow space for structural elements notably glass fibers or other preferably non-conductive and non-magnetic.

A significant consequence of the separation of the field into two separate bodies can be seen very clearly when the application demands variable speed capability. In this case it is often desirable to use wound field coils (electromagnets) is provide or supplement the flux of a permanent magnet(s). Note that all of the power dissipation, armature and field windings and the "iron" parts subject fast changing flux levels, all reside together solidly mounted on the structure where heat is conducted away. This allows the moving element to be isolated from major thermal sources and nearly completely when the implementation includes magnetic suspension which is effectively implemented by servo control using well known means to utilize the flux linking the two bodies, a principle of the technique being disclosed.

Recent radical developments in permanent magnets, specifically the rare earth alloys, have made them increasingly attractive choices for the field magnet source in d.c. motors, producing more magnetic energy per unit volume than electromagnets with no power required. The result is a motor of high efficiency and power density, however, it has a single operating point of peak efficiency, this limitation can be overcome by using electromagnets in parallel with the permanent magnet. Their iron core conducts flux in both directions, effectively shorting out the permanent magnet flux—a wise implementation is to take advantage of this characteristic at both higher and lower speeds, using the controlled currents to both increase and to decrease the effective motor field flux. The fact that this disclosure shows how the field flux sources can be fixed on the same structure with the armature allows direct access for control and power inputs, and provides a new route to variable velocity drive systems for improved performance and power efficiency which can contribute to the national goal of energy savings, as direct drive and variable speed d.c. motors are known to be as replacements for less efficient a.c. motors.

The field of application are widespread, the switch to d.c. drives is already well along in medical, semiconductor mfg., aircraft, and all types of battery power equipment applications. The US Navy is going electric, new catapults exemplifying one of the highest power linear motors. The high power density of d.c. motors will be matched by the friction debris and lubrication eliminating attributes of magnetic bearings in the effort to achieve greater precision and maintenance free reliability. Hence, we show how this new technology can be the basis for future magnetic levitation (MagLev) transportation systems, (see FIG. 3). Here the indefinite length, low cost benefits of the magnetic suspension and near frictionless powering of a body (in this case a vehicle) of this disclosure become clearly evident.

It represents a chance for the US to overtake the German and Japanese many year lead by eliminating the formidable expense of powered railways and exotic superconductors.

One aspect of the invention is a motor that separates the functional elements of an electronically commuted linear direct current motor into three parts, yielding unique characteristics. The field assembly may consist of two distinct parts, one of which contains the source of magnetic flux and is fixed to the armature, the other free to move linearly with respect to the armature. The other part of the field assembly may receive flux across an airgap, divide it into multiple poles, the poles interdigitated with another of opposite polarity, both facing the armature. The motor may have a variable field enabling the motor characteristic to be varied dynamically to suit the load condition. The armature may be composed solely of insulated conductors with no ferrous material (so-called ironless construction), in which case the moving element may reach around the other side to shorten the flux path. The field magnet may be a permanent magnet, electromagnet, or a combination of both. Virtually all of the heat generated by the device and its commutation and control electronics may be directly conducted to a mounting structure, and not the moving element, in some embodiments. The motor may extend the attributes of variable field d.c. motor technology to linear motion devices to extend their operational capacity and improve heat rejection. The movable element may be magnetically supported and/or controlled by control of the magnetic flux between these elements as a motor or separate bearing fluxes.

Thus, another aspect of the invention is a non-contacting device containing both magnetic suspension and linear d.c. motor drive capability. The device may employ common magnetic structure and flux source to produce suspension capability and linear d.c. motor flux. The device may, in some embodiments, include an electromagnetic structure capable of load-bearing in at least one axis, maintaining alignment, stabilizing lateral position, and producing bi-directional forces along the desired straight line. The device may be capable of electromagnetic control over suspension, propulsion, and alignment when connected to a d.c. power source controlled or commuted by intelligent electronics with respect to multi-axis displacement sensors. The device may have electromagnetic coils so located as to provide control over vertical, lateral, and rotational motion and, when used redundantly a distance apart, can control all degrees of freedom while allowing unrestricted axial motion when desired.

Another aspect of the invention is a magnetic-bearing structure with small total reluctance change due to displacement in the direction of suspension.

DETAILED DESCRIPTION OF CERTAIN INVENTIVE EMBODIMENTS

Figure 1A:
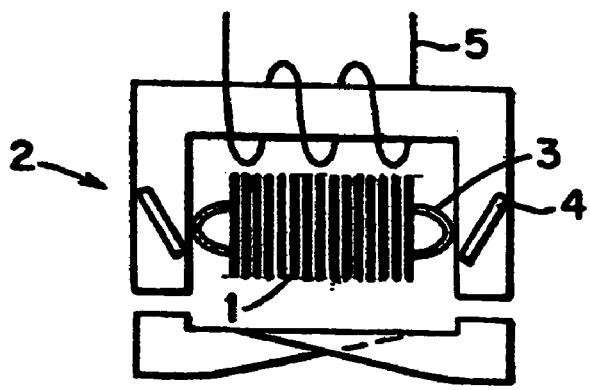
FIG. 1 illustrates a three element linear d.c. motor.
Figure 1B:
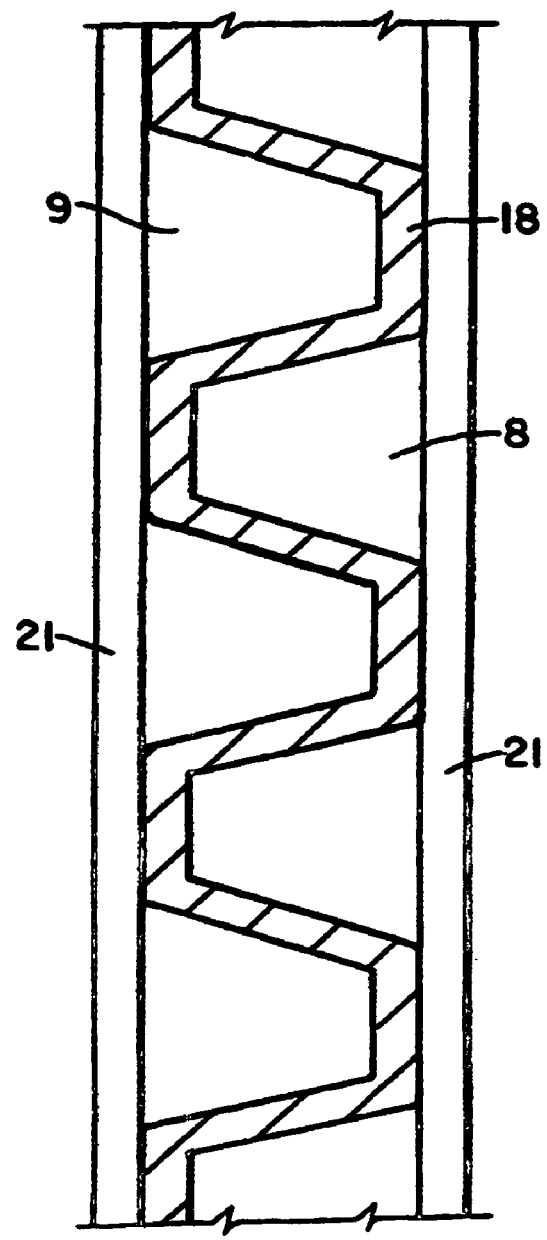

FIG. 1 illustrates a three element linear d.c. motor. Illustrated are the three parts of this novel motor. The armature 1 is standard, the field 2 is composed of a piece containing the source of magnetic flux 4 (stationary with respect to the armature), and the third element is a part with continuous axial surfaces 21 and interdigitated salient poles 8, 9, separated by a non-magnetic material 18.

An ironless armature version of the motor of FIG. 1 can also be employed, having the functionally same parts with the unique armature 1 containing no ferrous material formed in such a way to force magnetic flux thru a set of conductors (normally of three phases, connected for electronic commutation) in alternating directions to generate an e.m.f. when moved linearly with respect to each other, and axial thrust when energized by a suitable current source.

Figure 2A:
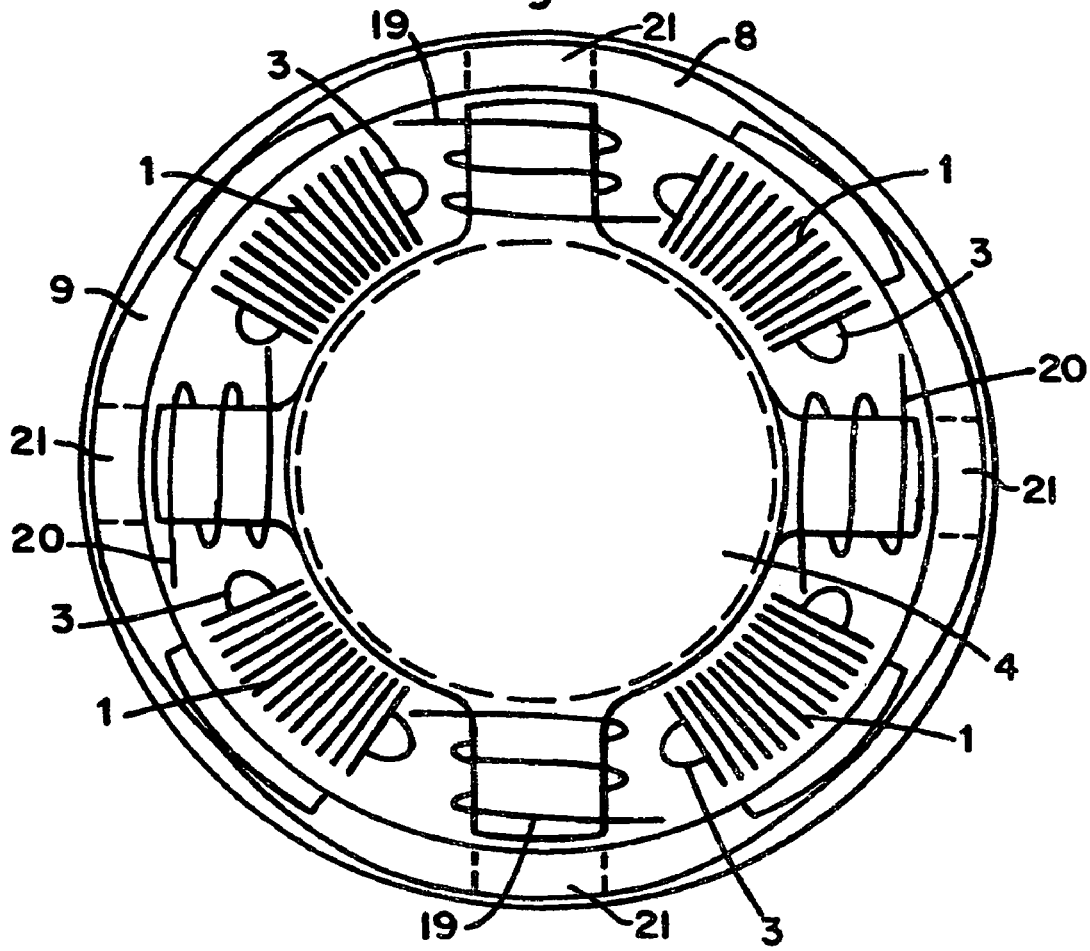
FIG. 2 illustrates a cylindrical form of a linear brushless d.c. motor with stationary armature and field.

FIG. 2 illustrates a cylindrical form of a linear brushless d.c. motor with stationary armature and field. FIG. 2a shows a cross-section in which the following can be seen: an endplate with lateral control coils, a centrally-located disc permanent magnet 4 (dotted) for bias flux and motor field flux, a second plate with control coils 19, 20, the location of ferrous laminated armature strips, which contain slots for circumferentially wound motor coils, and an outer cylindrical moving element with continuous axial surfaces for field flux from P.M. and transition to salient poles and thence to armature, all without physical contact of moving surfaces.

Figure 2B:
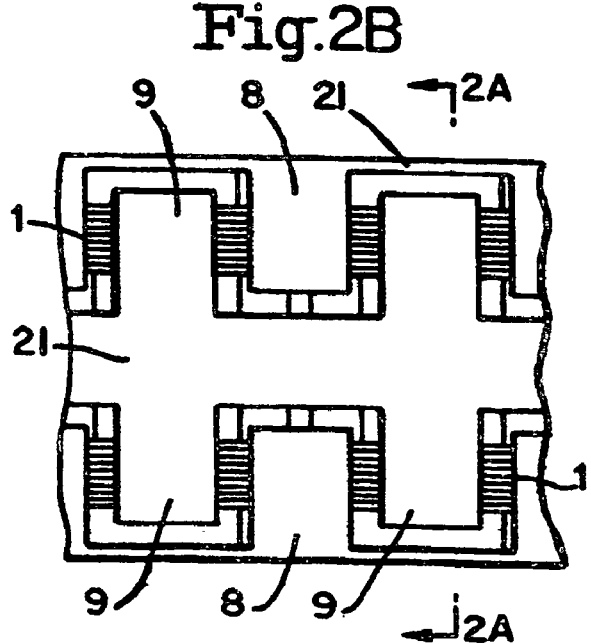

FIG. 2b is a side view of the cylindrical form of a linear brushless d.c. motor which shows one and two partial steel parts, with axially continuous surface, branching to a multiplicity of salient poles. Alternate parts have their poles interleaved so that the axial progression alternates in polarity as seen by the armature conductors.

FIG. 2b also shows laminated axial strips (between poles) in which armature conductors are placed in slots (shown by lines every ⅙ pole span) which are typically delta or wye connected in a three-phase manner electronically commutated according to axial pole position sensors.

Figure 3A:
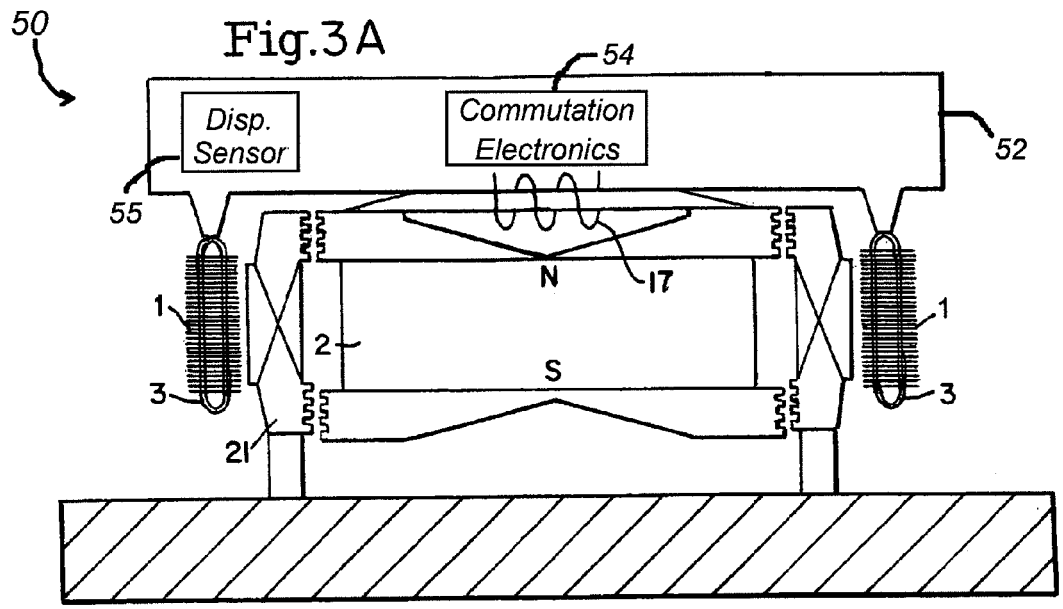
FIG. 3 shows a cross-section of a suspended motor/suspension assembly on a linear "track".
Figure 3B:
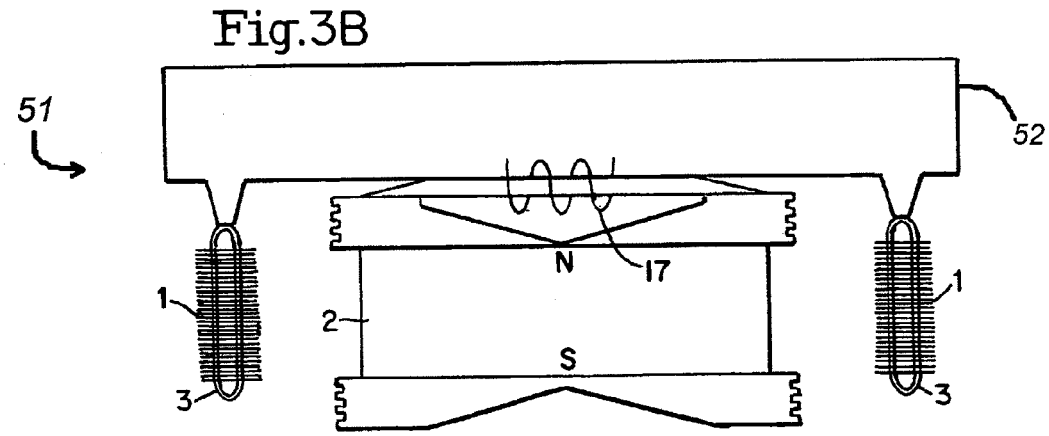
Figure 3C:
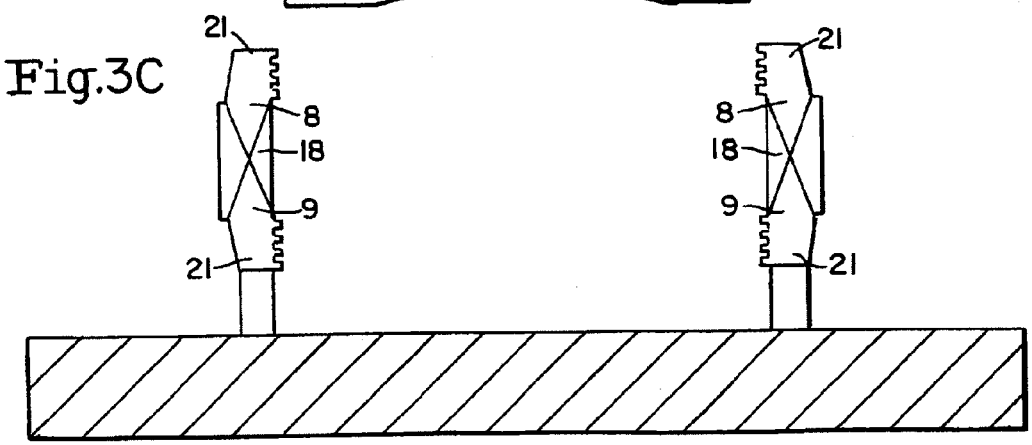

FIG. 3 shows a cross-section of a MagLev transportation system 50 including a vehicle 51 comprising a suspended motor/suspension assembly on a linear "track". The track 21 is shown in cross section with interdigitated poles 8, 9 with inward surfaces to face the permanent magnet field assembly and outward surfaces to face the armature laminations. The magnet assembly has mating surfaces separated by an airgap maintained at a constant distance from the armature surface by bidirectional control currents in accordance with gap displacement sensors 55.

A permanent magnet 2 supplies magnetic flux through surfaces separated by airgaps from continuous members on each of pole pieces from whence the flux passes back and forth from the armature 1 through the opposite facing gaps. The flux returns to the source of magnetic flux 2. These permeable elements are directly joined together by the solid arms of a frame 52 bearing coils which control the proportion of flux according to at least one of the multi-axis displacement sensors 55, to maintain the suspended element laterally with respect to the track.

Similar units fixed to each other and capable of supporting its share of a vehicle and payload with two or more some distance axially apart provide stable alignment parallel to the track without constraint on axial motion. The conductors in the slotted armature laminations develop an A.C. voltage when made to traverse the ladder-like pole structure of alternating polarities. A diode network properly connected to these coils provides a d.c. current source. When these same terminals are supplied with a commutated voltage exceeding the generated voltage provided by, e.g., commutation electronics 54, a constant linear force is created to propel the suspended assembly and its payload. This demonstrates a non-contacting suspension and propulsion system with no moving parts having d.c. traction motor characteristics.

Prior to the 1960's, direct current motors could always be described as having two parts; a rotating armature and a fixed field assembly. With the advent of electronic commutation, these two parts were reversed, the armature became the stationary part of the motor and the rotor is the field, generally a permanent magnet or magnets. The armature usually consisted of conductors placed into slots in a laminated steel structure.

This is still the textbook version of the device. However, in order to reduce rotational (iron) losses, an armature composed of freestanding conductors with no surrounding iron was used. This has been called ironless armature construction. Also, in the early days of "brushless" motors NASA built a radically new form of d.c. motor in which the source of field flux and the armature were mounted together and remained fixed. (See U.S. Pat. No. 3,569,804) A passive salient multi-pole rotor became the only moving element; this "iron" pole structure provided high inertia to the rim of an attitude control flywheel while a small armature segment and field coil were the only stationary electromagnetic parts.

This disclosure describes for the first time a linear motion machine based on these same principles. In addition to showing of a unique form of linear motor it is noted that linear motors exhibit special bearing problems and that this configuration which passes large flux levels between the stationary and moving parts, is naturally suited to magnetic control of the position and alignment of the moving element. This disclosure not only shows how this may be efficiently accomplished with no physical contact, but combines the functional elements in a common electromagnetic structure, saving weight, material and increasing power density.

A particular embodiment is a machine combining non-contacting magnetic suspension with linear D.C. motor propulsion such that a vehicle can efficiently propel itself and a large payload along a passive steel track. This is a great step forward in MagLev technology since it dramatically reduces the (powered) track costs associated with both German and Japanese systems in various stages of development and demonstration worldwide and could bring Dr. Goddard's 100 yr. old leadership in MagLev technology back to the United States.

It combines new magnetic suspension techniques, superior to those currently demonstrated, with a new type of the proven best traction motor on passive rails. Integration of these two functions is weight, power, and cost efficient, bringing D.C. traction motor capability to MagLev systems for the first time with effective suspension technology reducing power demands.

The invention claimed is:

1. A device for causing motion of an object along a set of rails comprising a first rail and a second rail, the device comprising:
    a first conductor attached to the object and a second conductor attached to the object, wherein the first and second conductors are configured to carry electrical currents; and
    a source of magnetic flux attached to the object at a position between the first and second conductor, wherein the source of magnetic flux is configured to be positioned between the first and second rail and to provide a suspensive force by inducing a magnetic flux in at least a portion of the first and second rail,
    wherein an interaction of the magnetic flux and the electric currents causes the object to move along the rails.

2. The device of claim 1, wherein the object comprises a vehicle.

3. The device of claim 1, wherein the object comprises a portion of a MagLev transportation system.

4. The device of claim 1, wherein at least one of the first and second conductor comprises a conductive winding.

5. The device of claim 1, wherein the source of magnetic flux comprises a permanent magnet.

6. The device of claim 5, wherein the permanent magnet comprises a rare earth alloy.

7. The device of claim 5, wherein the permanent magnet comprises at least one of a samarium-cobalt magnet and a neodymium magnet.

8. The device of claim 1, wherein the source of magnetic flux comprises an electromagnet.

9. The device of claim 1, further comprising at least one position sensor configured to determine the position of the object with respect to the rails.

10. The device of claim 9, wherein the at least one position sensor is configured to determine the axial position of the object with respect to the rails.

11. The device of claim 10, further comprising commutation electronics configured to commutate the electrical currents based on the axial position of the object determined by the sensor.

12. The device of claim 9, wherein the at least one position sensor is configured to determine the lateral position of the object with respect to the rails.

13. The device of claim 12, further comprising a control coil configured to supplement the magnetic flux based on the lateral position of the object determined by the sensor.

14. The device of claim 1, wherein the suspensive force is sufficient to levitate the object.

15. The device of claim 1, wherein the suspensive force levitates the object.

16. A levitating propulsion system comprising:
    a first and second rail;
    a frame;
    a first conductor attached to the frame and a second conductor attached to the frame, wherein the first and second conductors carries electrical currents; and
    a source of magnetic flux attached to the frame at a position between the first and second conductor and between the first and second rail, wherein the source of magnetic flux provides a suspensive force by inducing a magnetic flux in at least a portion of the first and second rail,
    wherein an interaction of the magnetic flux and the electric currents causes the object to move along the rails.

* * * * *

UNITED STATES PATENT AND TRADEMARK OFFICE
CERTIFICATE OF CORRECTION

PATENT NO. : 7,617,779 B2
APPLICATION NO. : 11/272103
DATED : November 17, 2009
INVENTOR(S) : Philip Albert Studer It is certified that error appears in the above-identified patent and that said Letters Patent is hereby corrected as shown below:

At Column 8, Line 41, please delete "carries" and insert therefor, --carry--.

Signed and Sealed this

Seventeenth Day of August, 2010

David J. Kappos
*Director of the United States Patent and Trademark Office*